Patented Mar. 4, 1924.

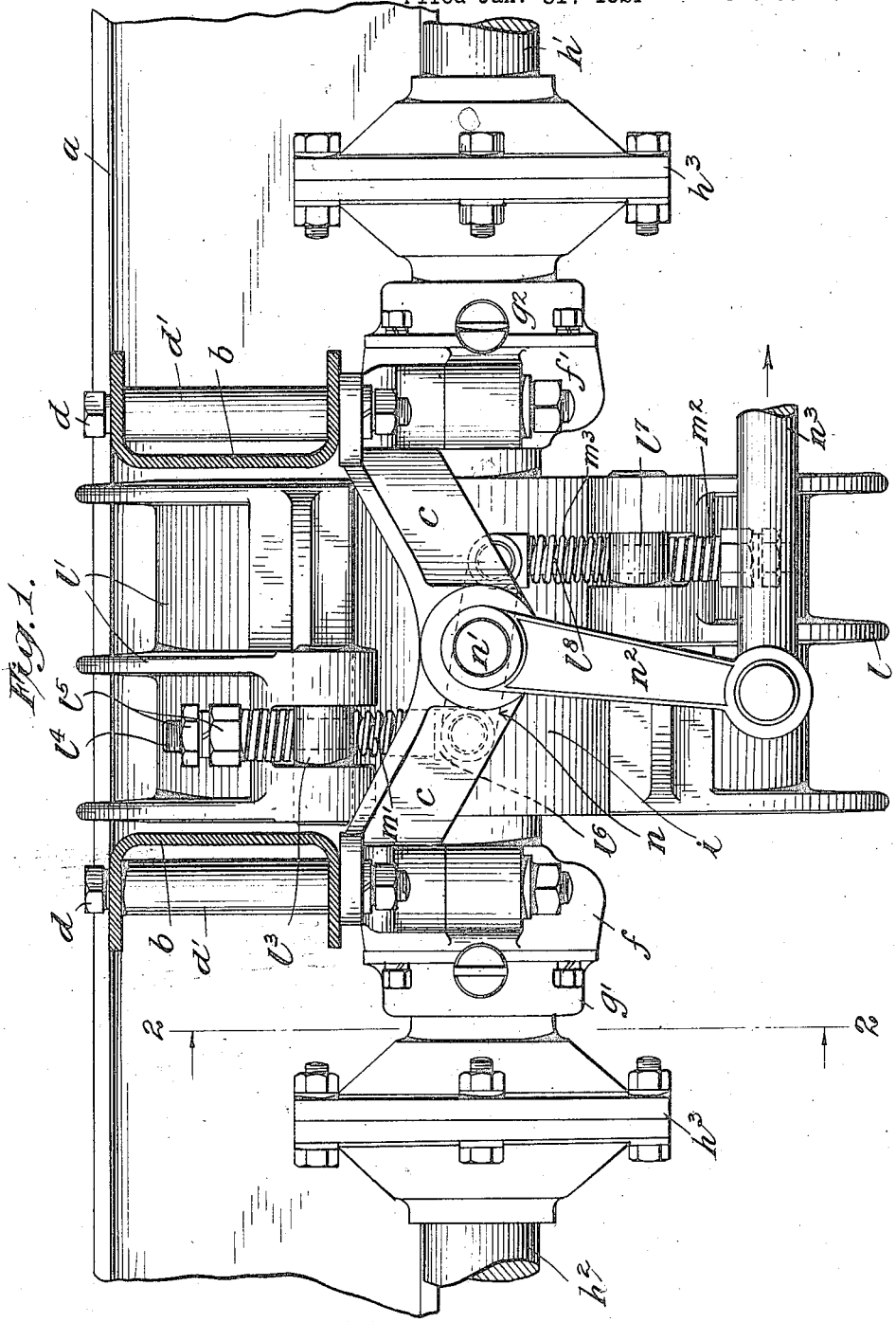

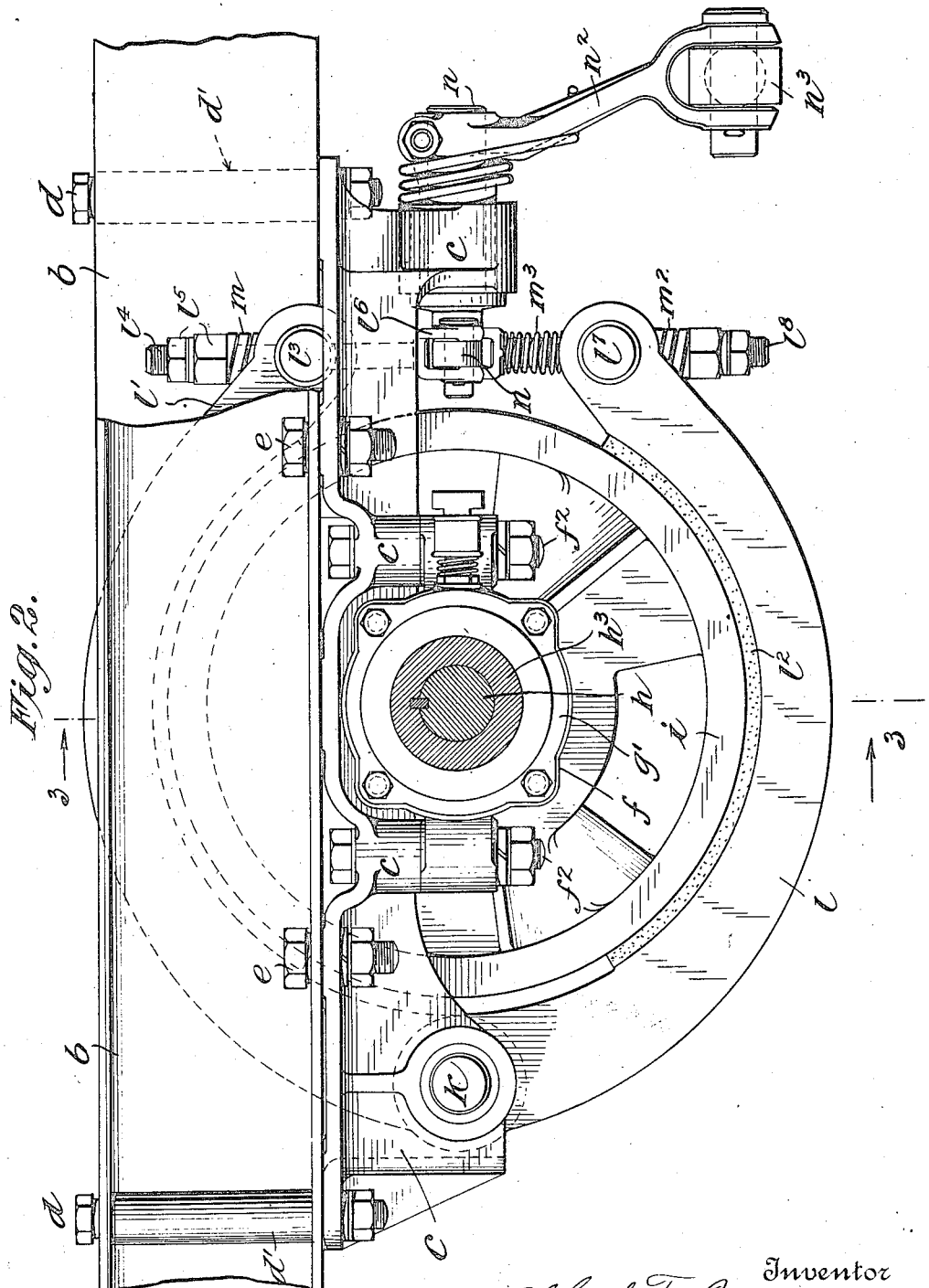

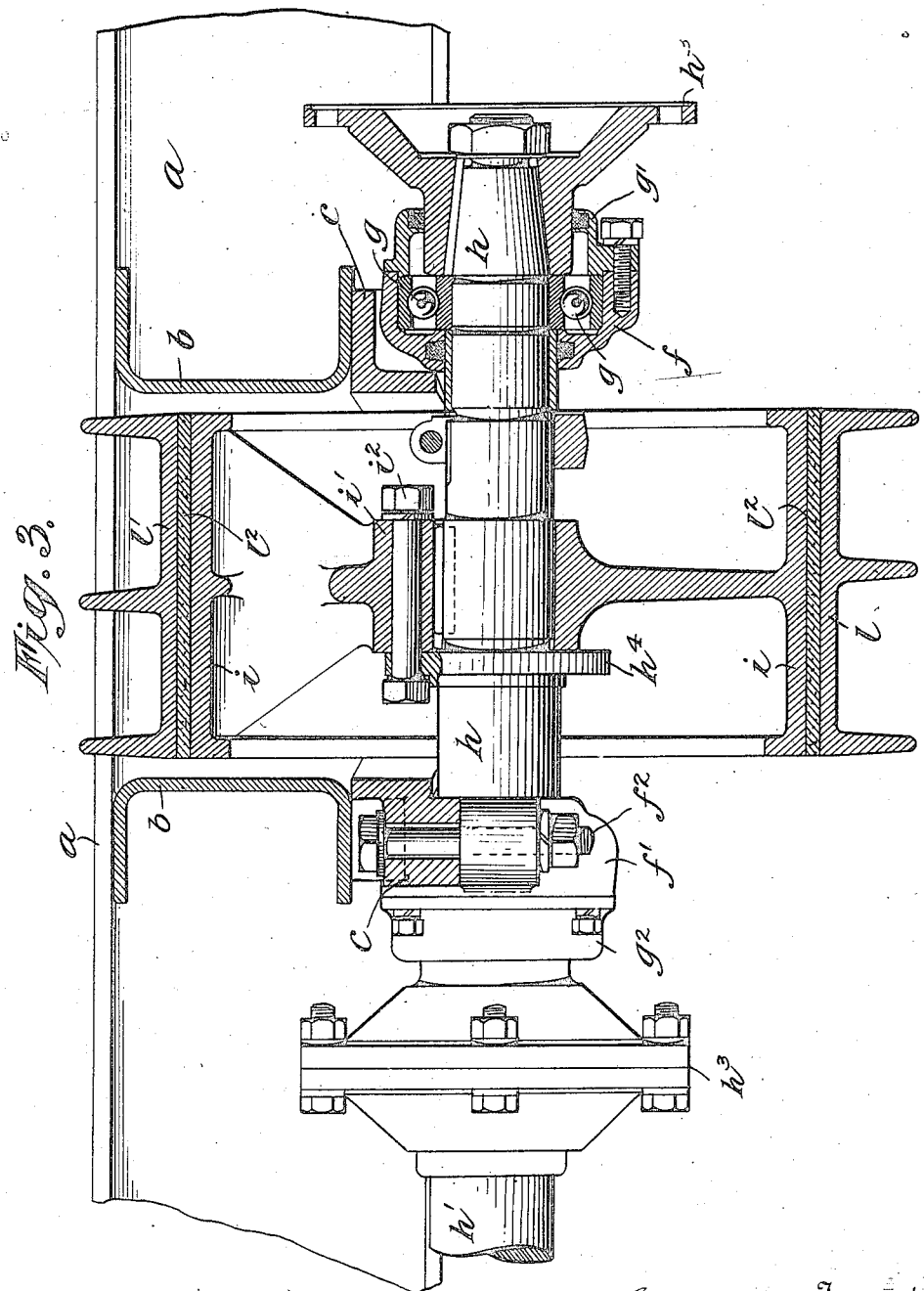

1,485,686

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

BRAKE FOR MOTOR VEHICLES.

Application filed January 31, 1921. Serial No. 441,130.

*To all whom it may concern:*

Be it known that I, ALFRED F. MASURY, a citizen of the United States, residing in the borough of Manhattan, of the city of New York, in the State of New York, have invented certain new and useful Improvements in Brakes for Motor Vehicles, of which the following is a specification, reference being had to the accompanying drawings, forming a part hereof.

Brakes for motor vehicles have been mounted on the propeller shaft but such brakes and their operating mechanism have not been formed as self-contained units, that is, mechanical entities which might be mounted, or demounted without disturbing the alinement of the chassis or of the shafting alinement of any unrelated parts of the motor vehicle. The principal object of the present invention is to provide a brake unit for the propeller shaft which shall have the drum and its co-operating elements mounted on a single frame and removable therewith for adjustment or replacement. A further object is to provide in a brake structure of this character separate shaft sections for the brake drum which may be connected to other shaft sections of the propeller shafting and constitute mechanically a part thereof but be removable therefrom without disturbing said shaft when the brake unit is to be demounted. A further object is to improve generally the construction of brakes and particularly brakes for propeller shafts by simplifying the parts and their relation and providing operating mechanism which will bring about a yielding application of the shoes, thereby eliminating the quick and freezing applications which are now so frequent and so destructive to the mechanism of motor vehicles. In carrying out this object springs are operatively interposed between the operating lever and the brake shoes so that the brake tension is proportioned to the tension of said springs. A further feature of the applicating mechanism resides in the change of direction of the braking power and its equal and opposite transmission to contracting brake shoes. A further feature of the invention peculiar to the organization of parts on the propeller shaft is the support of bearing retainers for the brake shaft detachably on the frame for the entire braking mechanism, whereby said bearing retainers may be unbolted from the frame and the brake drum dropped.

These and other objects will be explained fully in the detailed description which follows of the practical embodiment shown in the drawings. In the drawings—

Figure 1 is a view in side elevation of the improved brake, a fragment of one of the side frame members of a motor vehicle being indicated and also fragments of the propeller shafting which extends forwardly and rearwardly from the brake shaft.

Figure 2 is a view of one face of the improved brake taken through a section of the brake shaft on the plane indicated by the line 2—2 of Figure 1 and looking in the direction of the arrows.

Figure 3 is a view in longitudinal section through the improved brake mechanism and taken on the plane indicated by the line 3—3 of Figure 2 and looking in the direction of the arrows.

Certain features of the invention are concerned particularly with the provision of improved brake mechanism for application to a propeller shaft. Certain other features are not limited to such an application but have to do with improved brake structure per se. The line of demarkation in so far as concerns the practical adaptations and the scope of the invention will be clear to one skilled in the art.

One of the side frame members $a$ of a motor chassis is indicated in Figures 1 and 3. Extending transversely of the chassis from this frame member $a$ to the other side frame member are two supporting rails shown as channels $b$. To these transverse trusses $b$ may be bolted an integral frame $c$ of generally rectangular outline, as by means of bolts $d$ passing upwardly through the trusses $b$. These bolts $d$ may pass through spacing sleeves $d'$ resting within the channels $b$. Other bolts $e$ may pass through the flanges of the channels $b$ and engage the brake frame $c$.

To the frame $c$ may be secured at opposite sides bearing retainers $f, f'$, as by bolts $f^2$, passing through the retainers and through the frame. In these retainers $f, f'$ are supported suitable bearings shown as ball bearings $g$ which are held removably in place by bearing caps $g', g^2$ which may be bolted to the respective retainers $f, f'$. In the bearings $g$ is journaled a brake shaft $h$ which becomes a short section of the propeller shafting, two sections $h'$, $h^2$ of which, extending to appropriate elements in the motor vehicle, are illustrated in Figure 1. The brake shaft $h$ may be coupled to the respective sections $h'$, $h^2$ through any approved type of coupling, preferably of a flexible type, illustrated conventionally at $h^3$ in the drawings.

The brake shaft $h$ in the preferred form has thereon an annular flange $h^4$ and receives a brake drum $i$ which is keyed on to the shaft and has its hub $i'$ in engagement with the face of the flange. Bolts $i^2$ passing through the hub $i'$ and through the flange $h^4$ serve to secure the drum fixedly to the shaft. In one of the ends of the generally rectangular frame $c$ is supported a transverse pin $k$ on which are pivoted curved brake shoes $l$, $l'$ properly lined, as at $l^2$, and adapted to embrace the greater part of the periphery of the brake drum $i$. The free end of one of the shoes $l'$ carries a guide $l^3$ for an operating bolt $l^4$ which passes through said guide and has, at one side of the guide a spring $m$ which is interposed between the guide and adjustable nuts $l^5$, and has at the other side of the guide a second spring $m'$ which is interposed operatively between the guide and the head $l^6$ of the operating bolt. The free end of the other brake shoe $l$ carries a similar guide $l^7$ through which passes an operating bolt $l^8$ for the brake shoe, springs $m^2$ and $m^3$, corresponding respectively to the springs $m$ and $m'$, being operatively associated with the bolt $l^8$ at opposite sides of the guide $l^7$. The heads of the bolts $l^4$, $l^8$ are pivotally connected to a cross arm $n$ carried on a rock shaft $n'$ which is journaled in the end of the frame $c$ opposite from the bearing point of the pin $k$. The rock shaft $n'$ may carry an operating arm $n^2$ connected as through linkage $n^3$ to any convenient device for operation of the brake.

The improved unit is to be considered as a self-contained entity with reference to the rectangular supporting frame $c$ which is bolted to the transverse trusses $b$. The description given makes it plain that the brake shaft $h$ is journaled in the bearing retainers $f$, $f'$ which are bolted detachably to said frame $c$. The description also has made it clear that the brake drum $i$ is carried on this brake shaft $h$, that the operating brake shoes $l$, $l'$ are journaled in the frame $c$ and that the operating mechanism for the shoes associated with the rock shaft $n'$ is also carried on the frame $c$. This disposition of parts makes it evident that in mounting the brake mechanism all of the parts thereof may be completely assembled on the frame $c$ before the latter is bolted in place. The last operation in mounting would consist in coupling the short shaft $h$ to the associated sections $h'$, $h^2$ through suitable members, such as are indicated at $h^3$. In demounting the self-contained unit the reverse operations are effected. On the other hand, by dropping the lower brake shoe $l$ the bearing retainers $f$, $f'$ might be unbolted from the frame $c$ and the drum $i$ with the shaft $h$ be removed and later restored. Any and all of these operations may be carried on without disturbing the alinement of the chassis or of the shafting or of any of the parts of the motor vehicle which do not enter into the brake mechanism. The entire structure is comparatively simple and the parts thereof are very accessible.

The operating mechanism itself constitutes an improvement in brake structures. The applicating power is transmitted through a rod, such as $n^3$, to the rock shaft $n'$ and then changed in its direction of application through the cross arm $n$ to the respective operating bolts $l^4$, $l^8$. The cross arm $n$ when rocked draws these bolts with equal power exerted along parallel lines but in opposite directions. This power is not applied directly to the respective brake shoes $l$, $l'$ but instead is transmitted through the respective springs $m^2$, $m$ to said shoes. The force of application is accordingly proportioned to the tension of the springs. Upon release the respective springs $m^3$, $m'$ become effective to throw the shoes $l$, $l'$ out of operative engagement with the brake drum $i$. The braking power is applied with great leverage and yet with a uniform yielding draw. Destructive strains and shocks are avoided and the life of the braking mechanism as well as of the vehicle is accordingly prolonged.

Changes in design and arrangement falling within the skill of the mechanic may be made and one or more of the novel features described may be employed singly without departing from the invention as its scope is intended to be defined by the appended claims.

I claim as my invention:

1. In a motor vehicle, in combination with the side frame members of the chassis and a propeller shaft, a brake drum carried on said shaft, a frame supported on the side frame members of the chassis, a pair of bearings for the shaft carried removably on said frame, at the front and rear thereof, respectively, brake shoes for the drum supported operatively on said frame and operating mechanism for the shoes supported on said frame.

2. In combination with a motor vehicle and the side frame members of the chassis and a propeller shaft extending longitudinally between said side frame members, transverse trusses extending between said side frame members, a frame comprising front and rear transversely extending elements supported removably on said trusses, a pair of bearing retainers secured detachably to said frame at the front and rear thereof, respectively, and having the propeller shaft journaled therein, brake shoes pivoted on said frame and brake operating mechanism engaged operatively with said shoes and carried by said frame.

3. In a motor vehicle in combination with the side frame members of the chassis and a propeller shaft extending longitudinally therebetween, a detachable shaft section coupled in said propeller shaft, a brake drum on the shaft section, a frame in which the front and rear ends of the detachable shaft section are journaled, means to support said frame on the chassis, and brake shoes and operating mechanism therefor operatively associated with said drum.

4. In a motor vehicle in combination with the side frame members of the chassis and a propeller shaft extending longitudinally therebetween, a short shaft section coupled in said propeller shaft, a frame comprising front and rear transversely extending elements supported by said side frame members, bearing retainers secured detachably to said front and rear elements and in which said shaft section is journaled at each end, a brake drum carried on the shaft section and brake shoes and operating mechanism therefor operatively associated with said drum.

5. In combination with a brake drum and curved shoes extending in opposite directions about its periphery, operating mechanism for said shoes including a rock shaft, a cross arm carried thereby, means including adjustable springs for operatively connecting the cross arm with the free ends of said shoes, means to support the rock shaft with its axis in substantially the same plane with the axis of the drum but at right angles thereto and means to oscillate the rock shaft.

6. In combination with a brake drum and curved brake shoes cooperating with the periphery thereof, operating mechanism for the shoes including a rock shaft, a cross arm carried by the rock shaft, guides carried at the ends of the shoes, bolts passing through said guides, the ends of said bolts being connected operatively to the rock shaft, and springs carried by said bolts at opposite sides of the ends of said shoes for application of the braking power through said springs.

7. In a motor vehicle in combination with the side frame members of the chassis and a propeller shaft extending longitudinally therebetween, a short shaft section coupled in said propeller shaft, a frame supported by said side frame members, bearing retainers for the short shaft section detachably secured to said frame, a brake drum secured to said shaft section, brake shoes pivotally supported on said frame and co-operating with the periphery of said brake drum, and a rock shaft journaled in said frame and operatively connected with the free ends of said shoes for applying them to the drum.

8. Braking mechanism for a motor vehicle, comprising a frame including front and rear transversely extending elements, means for securing said frame to the chassis, a propeller shaft, a bearing for the propeller shaft carried by each of said front and rear transversely extending elements, a brake drum secured on the propeller shaft and located between the said front and rear elements of the frame, and brake shoes and operating mechanism therefor mounted on the frame.

9. In a braking mechanism for a motor vehicle, the combination of a frame including front and rear transversely extending elements, a bearing carried by each of said front and rear elements, a short shaft section journaled in said bearings, a brake drum fixed on said short shaft section between the bearings and brake shoes and operating mechanism therefor carried on the frame.

This specification signed this 28th day of January, A. D. 1921.

ALFRED F. MASURY.